(12) United States Patent
Kumar et al.

(10) Patent No.: US 12,443,492 B2
(45) Date of Patent: Oct. 14, 2025

(54) SUGGESTING BLUEPRINTS FOR RECOVERING COMPUTING OBJECTS

(71) Applicant: Rubrik, Inc., Palo Alto, CA (US)

(72) Inventors: Abhishek Kumar, San Jose, CA (US); Muraliraja Muniraju, Fremont, CA (US); Junchao Zhang, Newark, CA (US); Shiva Kumar Meka, Jangaon (IN)

(73) Assignee: Rubrik, Inc., Palo Alto, CA (US)

( * ) Notice: Subject to any disclaimer, the term of this patent is extended or adjusted under 35 U.S.C. 154(b) by 240 days.

(21) Appl. No.: 17/839,603

(22) Filed: Jun. 14, 2022

(65) Prior Publication Data

US 2023/0401127 A1    Dec. 14, 2023

(51) Int. Cl.
*G06F 11/14* (2006.01)

(52) U.S. Cl.
CPC ...... *G06F 11/1469* (2013.01); *G06F 11/1451* (2013.01); *G06F 11/1464* (2013.01)

(58) Field of Classification Search
CPC .. G06F 11/14; G06F 11/1451; G06F 11/1469; G06F 11/1464; G06F 2201/84
See application file for complete search history.

(56) References Cited

U.S. PATENT DOCUMENTS

| | | | | |
|---|---|---|---|---|
| 9,846,621 | B1 * | 12/2017 | Mirkhelkar | G06F 11/1464 |
| 10,089,163 | B2 * | 10/2018 | Sarkar | G06F 11/1425 |
| 10,555,145 | B1 * | 2/2020 | Siddiqui | H04L 41/0894 |
| 11,892,917 | B2 * | 2/2024 | Kumar | G06F 11/1417 |
| 2013/0227334 | A1 * | 8/2013 | Wang | G06Q 10/08 |
| | | | | 714/E11.078 |
| 2014/0149330 | A1 * | 5/2014 | Kaplan | G06F 16/3344 |
| | | | | 706/46 |
| 2016/0103673 | A1 * | 4/2016 | Curran | G06F 8/658 |
| | | | | 717/168 |
| 2017/0139930 | A1 * | 5/2017 | Maloney | G06F 40/131 |
| 2018/0067752 | A1 * | 3/2018 | Balboni | G06F 9/451 |
| 2023/0297495 | A1 * | 9/2023 | Kumar | G06F 11/1417 |
| | | | | 714/38.1 |
| 2024/0045770 | A1 * | 2/2024 | Kumar | G06F 11/2097 |

* cited by examiner

*Primary Examiner* — Kamini B Patel
(74) *Attorney, Agent, or Firm* — Holland & Hart LLP

(57) ABSTRACT

Techniques for data management at a data management system are described. Characteristics for a set of computing objects managed by a computing system may be determined. The characteristics determined for the set of computing objects may be used to group the computing objects into groups. Based on grouping the computing objects, instructions for recovering the computing objects may be generated. The instructions may be provided to a user as a suggestion. Based on receiving a selection of the suggested instructions, the suggested instructions may be configured for a recovery of the computing objects of the computing system.

16 Claims, 7 Drawing Sheets

US 12,443,492 B2

SUGGESTING BLUEPRINTS FOR RECOVERING COMPUTING OBJECTS

FIELD OF TECHNOLOGY

The present disclosure relates generally to data management, and more specifically to techniques for suggesting blueprints for recovering computing objects.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system may recover computing objects protected by the data management system in accordance with a previously determined set of instructions for recovering the computing objects (which may be referred to as a "blueprint"). A blueprint for recovering computing objects may be generated by a customer. The blueprint may indicate an order for recovering data objects, computing resource allocations for the recovered data objects, service level agreements for the recovered data objects, and the like. As a quantity of computing objects increases, a burden on a customer to create a comprehensive blueprint may also increase. That is, manually generating a blueprint for hundreds or thousands of computing objects may be a large undertaking and may be unfeasible for many customers. Additionally, such a task may be unfeasible for even sophisticated customers as information for generating an efficient blueprint (e.g., real time data, such as I/O information, data patterns, etc.) for a large quantity of computing objects may not be available to customers.

To support the generation of blueprints for large quantities of computing objects, a data management system may be used to determine characteristics of the computing objects and to generate one or more suggested blueprints for recovering the computing objects based on the determined characteristics. The data management system may provide the suggested blueprints to a customer for selection.

Figure 1:
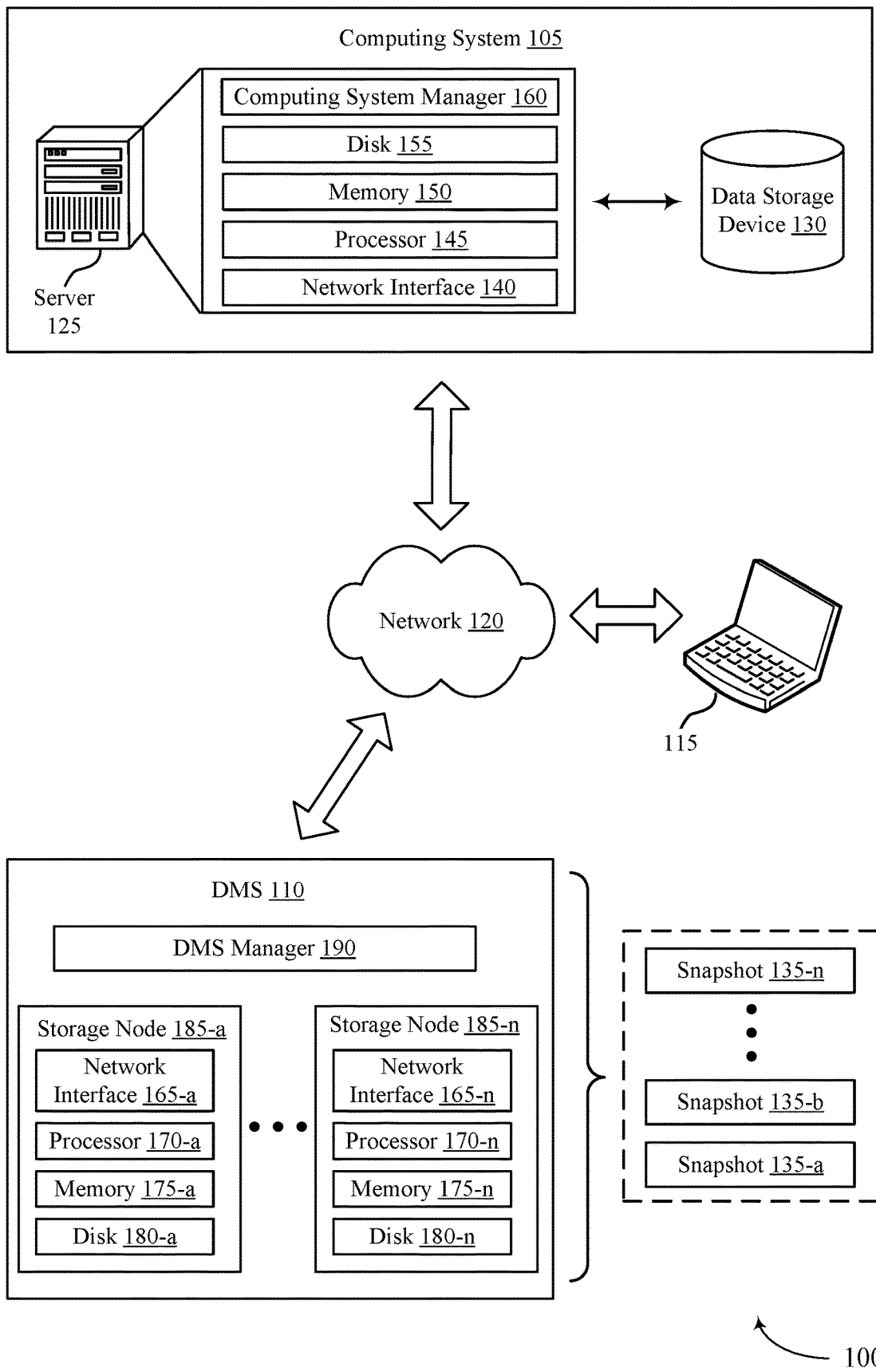
FIG. 1 shows an example of a computing environment that supports suggesting blueprints for recovering computing objects in accordance with aspects of the present disclosure.

FIG. 1 shows an example of a computing environment 100 that supports suggesting blueprints for recovering computing objects in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

The computing system 105 may be used to manage the operation of a large quantity (e.g., hundreds or thousands) of computing objects (e.g., file systems, databases, virtual machines, containers, remote desktops, etc.) used to support the operation of both internal and external services that are managed by a customer. In some examples, the computing system 105 may be a multi-tenant system and may be used to store computing objects for multiple customers. The computing objects may have one or more characteristics. For example, the computing objects may have names, have IP addresses, have assigned SLAs, have data patterns, have assigned computing groups, have creation times, be located in certain locations (e.g., certain server racks or data centers), etc.

Groups of the computing objects may be used together to support a service (e.g., a web service, an email service, etc.) offered by a customer. For example, a database and a virtual machine that hosts a web service may be used together to support a web application. In some examples, a computing object (e.g., a virtual machine) may be used as a remote desktop (e.g., a Linux desktop) for a user (e.g., an employee) of the customer. In some examples, relationships between computing objects may be determined based on the characteristics of the computing objects. For example, a set of computing objects used to support the operation of a user application may share a common naming convention.

The DMS 110 may be used to store information that can be used to recover the computing objects—e.g., in the event of a failure at the computing system 105. The information may include application data that has been backed up to the DMS 110 for the computing objects, snapshot information that has been taken for the computing objects, or both. In the event of a failure at the computing system 105, the DMS 110 may be used to recover an operating state of the computing system 105 to a time preceding the failure—e.g., to the computing system 105 or to a failover computing system. A failure may include damage to the computing system 105, prolonged loss of power at the computing system 105, falling victim to a malware attack, and the like.

In some examples, the DMS 110 may recover the computing objects managed by the computing system 105 in accordance with a previously determined set of instructions for recovering the computing objects (which may be referred to as a "blueprint"). The blueprint may designate an order for recovering the computing objects—e.g., may indicate one or more of the computing objects to recover first, one or more of the computing objects to recover second, and so on. The blueprint may also designate computing resources (e.g., processing resources, memory resources, network resources) to be allocated to the computing objects once the computing objects have been recovered.

A blueprint for recovering computing objects may be generated by a customer. In some examples, a customer generates a blueprint that designates the restoration of the computing objects as follows: computing objects that keep track of user data (e.g., file systems), computing objects that are used to support system applications (e.g., security applications); computing objects that are used to support the operation of user applications (e.g., databases, helper services, etc.), computing objects that are used to run core user applications; computing objects that are used to run additional user applications. The blueprint may also designate an amount of computing resources to allocate to each computing object to ensure the proper operation of the computing objects. More generally, a customer may generate a blueprint that causes important and often-used computing objects to be recovered earlier than other computing objects and that ensures the proper functioning of these computing objects. A well-executed blueprint may enable an automated and or reduced-error (e.g., error-free) restoration of the computing objects, allowing a customer to seamlessly recover a computing infrastructure if a recovery event occurs.

As the quantity of computing objects managed by a computing system 105 increases, the burden on a customer to create a comprehensive blueprint may also increase. That is, manually generating a blueprint for hundreds or thousands of computing objects may be a large undertaking and may be unfeasible for many customers. Additionally, such a task may be unfeasible for even sophisticated customers as information for generating an efficient blueprint (e.g., real time data, such as I/O information, data patterns, etc.) for a large quantity of computing objects may not be available to customers.

To support the generation of blueprints for large quantities of computing objects, a data management system (e.g., the DMS 110) may be used to analyze the computing objects (e.g., identify characteristics, such as naming conventions, IP addresses, hosting servers, assigned SLAs, etc. and monitor the activity of the computing objects) and to generate one or more suggested blueprints for recovering the computing objects. The data management system may provide the suggested blueprints to a customer for selection.

In some examples, the DMS 110 may determine characteristics of a set of computing objects (e.g., databases, file systems, virtual machines, containers, etc.) managed by the computing system 105. The DMS 110 may group the computing objects based on the characteristics—e.g., the DMS 110 may create a group for each characteristics and include a computing object in each group with which the computing object shares the characteristic. Based on grouping the computing objects, the DMS 110 may generate instructions for recovering the computing objects (which may be referred to as a blueprint). For example, the DMS 110 may generate a first set of instructions for recovering a first set of computing objects that share a first characteristic (or combination of characteristics), a second set of instructions for recovering a second set of computing objects that share a second characteristic (or second combination of characteristics), and so on. In some examples, the DMS may generate multiple blueprints for recovering the computing objects—e.g., based on different objectives a customer may wish to meet, such as a quick recovery, a high-reliability recovery, a low-cost recovery, etc.

The DMS 110 may provide, to a user interface (e.g., at the computing system 105, computing device 115, or both), the one or more blueprints as a suggested blueprint. In some examples, the one or more blueprint indicates a grouping of the computing objects—e.g., a blueprint may indicate that computing objects with similar naming conventions have been grouped together, that computing objects with similar data patterns have been grouped together, and the like. In response to providing the one or more suggested blueprints to the user interface, the DMS 110 may receive a selection of one of the suggested blueprints and implement the suggested blueprint for the recovery of the computing system 105. Based on implementing the suggested blueprint for the computing system 105, if a recovery event occurs, the DMS 110 may recover the computing objects managed by the computing system 105 in accordance with the suggested blueprint.

By determining blueprints for recovering a computing system based on characteristics of computing objects at a computing system and suggesting the blueprints to a customer, a burden on a customer associated with generating blueprints may be reduced or removed. Additionally, by determining the suggested blueprints using information collected by a data management system, more efficient blueprints may be generated than could be generated by a customer, real-time changes to suggested blueprints or currently implemented blueprints can be made or suggested to a customer, or both.

Figure 2:
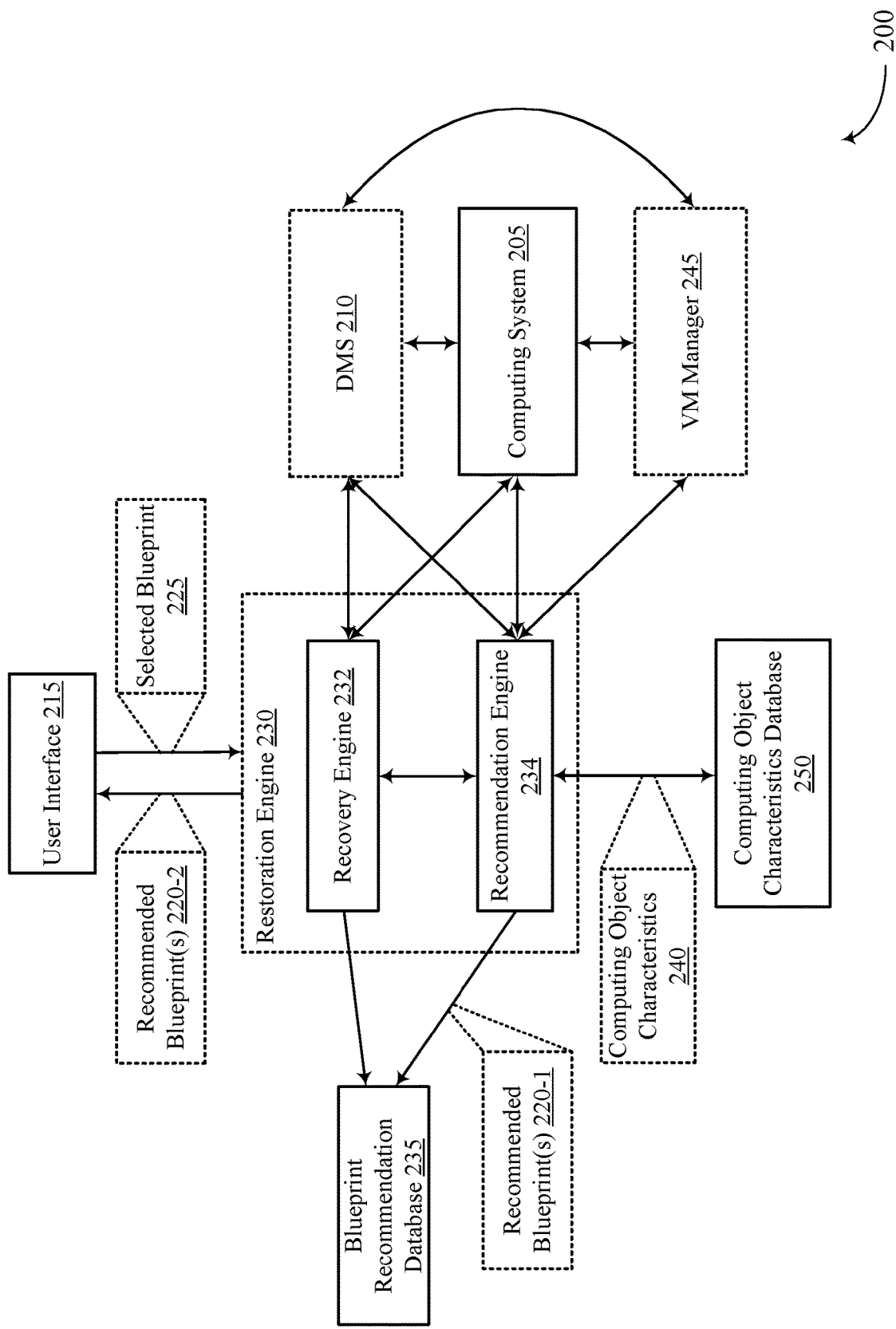
FIG. 2 shows an example of a subsystem that supports suggesting blueprints for recovering computing objects in accordance with examples as disclosed herein.

FIG. 2 shows an example of a subsystem that supports suggesting blueprints for recovering computing objects in accordance with examples as disclosed herein.

The subsystem 200 may include a computing system 205, a DMS 210, a VM manager 245, a restoration engine 230, a computing object characteristics database 250, a blueprint recommendation database 235, and a user interface 215. The computing system 205 and the DMS 210 may be respective examples of a computing system 105 and DMS 110 as described with reference to FIG. 1.

The computing system 205 may include a network of cloud computing system, private computing systems, or both, that are used to support the operation of computing objects managed by one or more customers. The computing system 205 may be used to manage file systems and databases. The computing system 205 may also be used to support the operation of virtual machines used to run system-specific software applications (e.g., operating systems). Additionally, the computing system 205 may be used to support the operation of containers used to run cross-platform application and software applications (e.g., web-based applications). In some examples, hundreds, thousands, or tens of thousands of computing objects may be running at the computing system 205 for one or more customers—where hundreds or thousands of computing objects may be running for a single customer.

The DMS 210 may be used to store information for recovering data to the computing system 205, states of the computing system 205, or both, to previous points in time. For example, in the event that data is lost at the computing system 205 (e.g., due to accidental deletion), the DMS 210 may be configured to recover the data to the computing system 205—assuming there is a backup at the DMS 210 storing the lost data. In another example, in the event that a customer wants to roll the computing system 205 back to a previous point-in-time (e.g., that occurred prior to a malware attack or system failure), the DMS 210 may be configured to provide the computing system 205 with the necessary information to revert the computing system 205 back to the previous point-in-time—e.g., by manipulating data stored at the computing system 205.

The DMS 210 may determine information about (e.g., characteristics of) the computing objects running at the computing system 205. For example, the DMS 210 may determine naming conventions of the computing objects, I/O patterns for the computing objects, IP addresses of the computing objects, and the like. In some examples, the DMS 210 may determine the I/o patterns based on monitoring I/O flows in the computing system e.g., as part of a procedure for backing up or taking snapshots of the computing system 205 in near real-time. The DMS 210 may also obtain information about virtual machines running on the computing system 205 from the VM manager 245.

The VM manager 245 may manage virtual machines running on the computing system 205 (including virtual machines running across different cloud and private environments within the computing system 205). For example, the VM manager 245 may determine resource allocations for a set of virtual machines running at the computing system 205 that are managed by the VM manager 245.

The restoration engine 230 may determine suggested blueprints for recovering computing systems, such as the computing system 205, and execute implemented blueprints for restoring the computing systems if a recovery event occurs. In some example, aspects of the restoration engine 230 may be implemented within the DMS 210. The restoration engine 230 may include the recovery engine 232 and the recommendation engine 234.

The recommendation engine 234 may obtain information about (e.g., the characteristics of) the computing objects running on the computing system. In some examples, the recommendation engine 234 obtains characteristics (e.g., naming conventions, data patterns, IP addresses, etc.) of the computing objects from the DMS 210. Additionally, or alternatively, the recommendation engine 234 may obtain characteristics (e.g., data patterns, computing groups, etc.) of the computing objects directly from the computing system. Additionally, or alternatively, the recommendation engine 234 may obtain characteristics (e.g., resource allocation to virtual machines, virtual machine types, etc.) from VM manager 245. The characteristics of the computing objects may include a name, a naming convention, a host server where the computing object is being implemented, a host data center where the computing object is being implemented, a service level agreement for the computing object, a creation time of the computing object, a computing group assigned to the computing object (e.g., a computing group for running a user application), an IP address of the computing object, a failover target for the computing object, a data pattern classification (e.g., a high churn data pattern, a frequent access data pattern, etc.) for the computing object, or any combination thereof.

The recommendation engine 234 may be configured to store the computing object characteristics 240 in a computing object characteristics database 250. In some examples, the recommendation engine 234 may periodically update the computing object characteristics database 250—e.g., based on obtaining additional information.

The recommendation engine 234 may further be configured to use the characteristics of the computing objects to determine one or more sets of instructions for recovering the computing objects if a recovery event occurs. To determine the sets of instructions, the recommendation engine 234 may place the computing objects into one or more groups based on their characteristics. For example, the recommendation engine 234 may place a first set of computing objects into a first group based on the computing objects sharing a common naming convention (e.g., a common prefix or appendix). The recommendation engine 234 may also place a second set of computing objects into a second group based on the computing objects being created within a threshold duration (e.g., minutes, hours, etc.) of one another. And so on. That is, the recommendation engine 234 may group computing objects that share similar characteristics together. A computing object may be included in more than one group. For example, a computing object may be in a first group based on having a similar naming convention as other computing objects in the group and in a second group based on having a similar creation date as other computing objects in the second group.

Based on grouping the computing objects based on common characteristics, the recommendation engine 234 may generate one or more sets of instructions for recovering one or more sets of the computing objects (which may be referred to as "recovery instructions"). For example, the recommendation engine 234 may generate a set of instructions for recovering the set of computing objects together based on determining that the set of computing objects are in a group indicating that the set of computing objects share a similar naming convention. In another example, the recommendation engine 234 may generate a set of instructions for recovering the set of computing objects together based on determining that the set of computing objects are in a first group indicating that the set of computing objects share a similar naming convention and in a second group indicating that the set of computing objects share a similar creation time. The recommendation may further generate a second set of instructions for recovering a second set of computing objects together—e.g., based on determining that the second set of computing objects are in a group indicating that the second set of computing objects share a similar data pattern classification. In some examples, the second set of instructions applies to a subset of the second set of computing objects—e.g., if the subset of the second set of computing objects is already covered by another set of instructions.

In addition to allocating sets of recovery instructions to sets of computing objects, the recommendation engine 234 may determine a pattern for executing the sets of recovery instructions. For example, the recommendation engine 234 may designate that a first set of recovery instructions is to be performed before a second set of recovery instructions, and so on. In some examples, the execution order of the sets of recovery instructions is based on the characteristics of the computing objects covered by the respective sets of recovery instructions. For example, the recommendation engine 234 may determine that the first set of recovery instructions is to be performed before the second set of recovery instructions based on determining that the computing objects covered by the first set of recovery instructions have a frequent-use data pattern.

In addition to allocating sets of recovery instructions to sets of computing objects, determining a pattern for executing the sets of recovery instructions, or both, the recommendation engine 234 may further determine an amount of resources to be allocated to the computing objects in the event of recovery. For example, the recommendation engine 234 may designate, in a first set of recovery instructions, an amount of resources to be allocated to the computing objects (e.g., collectively, or respectively) covered by the first set of recovery instruction—e.g., based on an amount of resources allocated to the computing objects at the computing system 205.

The recommendation engine 234 may include the generated sets of recovery instructions in a blueprint recommendation. In some examples, the recommendation engine 234 generates multiple blueprint recommendations based on multiple goals that a customer may wish to achieve (e.g., expedited recovery of essential services, expedite recovery of frequently used services, expedited recovery of remote desktops, etc.). The recommendation engine 234 may generate recommended blueprints for multiple customers that use the computing system 205. The recommendation engine 234 may store the first recommended blueprints 220-1 in the blueprint recommendation database 235.

The recovery engine 232 may be configured to access the blueprint recommendation database 235. The recovery engine 232 may be further configured to provide, to the user interface 215, the second recommended blueprints 220-2 for recovering computing objects at the computing system 205 that are managed by a particular customer, where the customer may have access to the user interface 215. The user interface 215 may be implemented at a computing device managed by the customer. The second recommended blueprints 220-2 may include one or more blueprints for recovering the computing objects running at the computing system 205 for the customer, where each blueprint may include one or more sets of instructions for recovering a portion (e.g., a majority or all of) the computing objects.

Based on sending the second recommended blueprints 220-2, the recovery engine may receive, via the user interface, an indication of the selected blueprint 225 for recovering the computing objects. In some examples, the selected blueprint 225 may include one or more modifications (e.g., made by the customer) to the recommended blueprint of the second recommended blueprints 220-2 that was selected by the customer. For example, the customer may modify the recommended blueprint so that the recovery of a set of computing objects is moved up in the recovery order. In another example, the customer may modify the recommended blueprint by designating a custom set of instructions for a subset of the computing objects (e.g., computing objects identified by the customer as important), where the custom set of instructions may override instructions for the set of computing objects indicated in the recommended blueprint.

In some examples, the recovery engine 232 receives a customer-generated blueprint from the user interface 215—e.g., prior to sending the second recommended blueprints 220-2. If the recovery engine 232 receives a blueprint from a customer, the recovery engine 232 may send the blueprint to the recommendation engine 234, where the recommendation engine 234 may generate the first recommended blueprints 220-1 based on the customer-generated blueprint.

If a recovery event occurs, the recovery engine 232 may be configured to orchestrate the recovery of the computing objects covered by the selected blueprint 225. The recovery event may be a disaster event, a malware event, a power loss event, an event that causes to damage to the hardware in the computing system 205, the triggering of a recovery test procedure, or a combination thereof. In some examples, as part of a recovery procedure for the computing system 205, the recovery engine 232 restores the computing objects at the computing system 205, which may include reinitializing the computing objects, allocating computing resources to the computing objects, restoring the computing objects to a state that preceding a failure of the computing system, and the like. Additionally, or alternatively, as part of the recovery procedure, the recovery engine 232 may similarly restore a portion (or all) of the computing objects at a location other than the computing system 205 (which may be referred to as a failover location).

Figure 3:
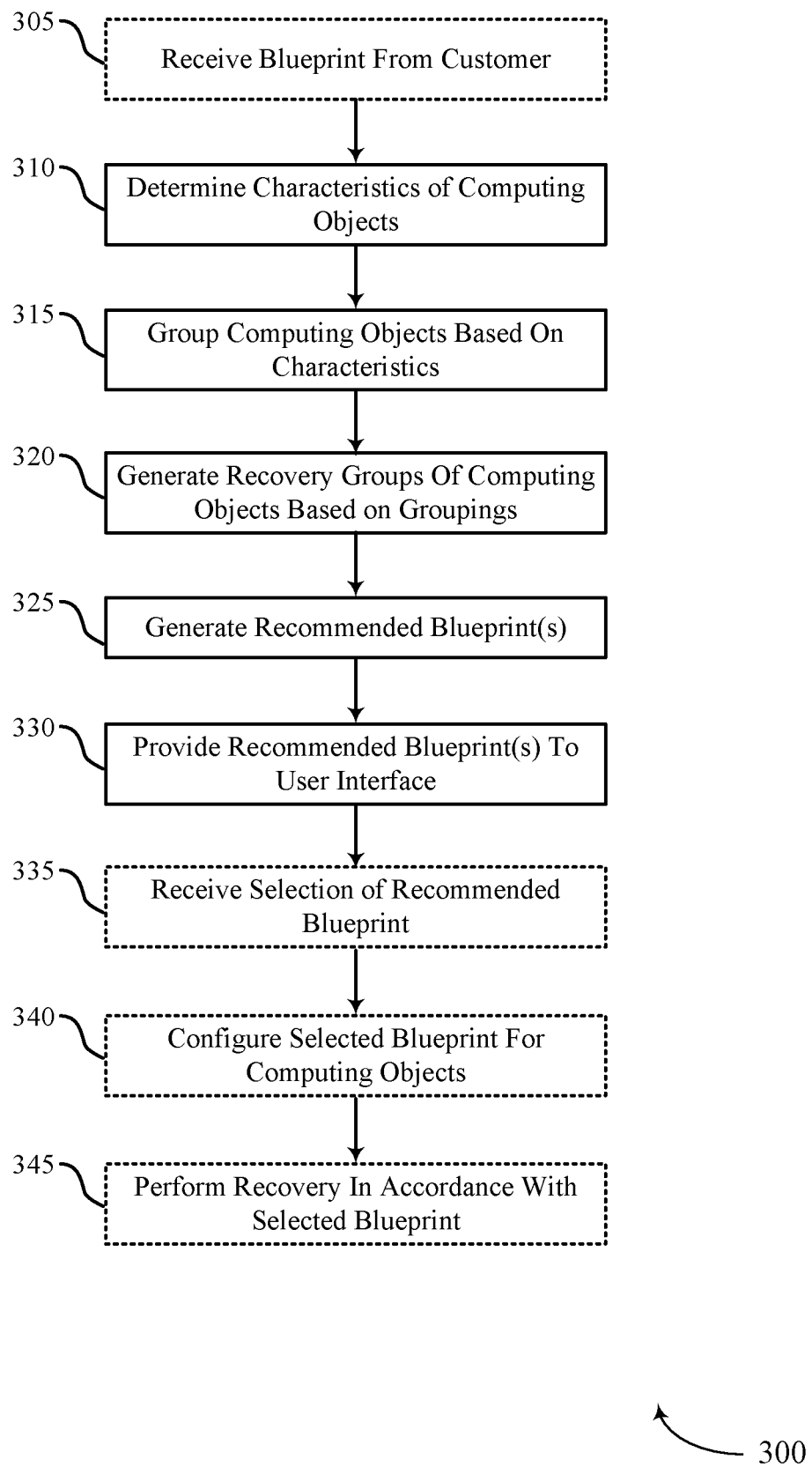
FIG. 3 shows an example of a set of operations for suggesting blueprints for recovering computing objects in accordance with examples as disclosed herein.

FIG. 3 shows an example of a set of operations for suggesting blueprints for recovering computing objects in accordance with examples as disclosed herein.

The flowchart 300 may be performed by a recommendation engine and a recovery engine, which may be example of a recommendation engine and a recovery engine described herein. In some examples, the flowchart 300 shows an example set of operations performed to support suggesting blueprints for recovering computing objects. For example, the flowchart 300 may include operations for generating recommended blueprints for recovering computing objects.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller, may cause the controller to perform the operations of the flowchart 300.

One or more of the operations described in the flowchart 300 may be performed earlier or later, omitted, replaced, supplemented, or combined with another operation. Also, additional operations described herein may replace, supplement or be combined with one or more of the operations described in the flowchart 300.

At 305, a blueprint may be received from a customer (e.g., from a device that include a user interface). In some examples, the blueprint may include a set of customer-generated instructions for recovering a portion of the computing objects running at a computing system (e.g., computing system 205). The set of computing objects indicated in the blueprint may include computing objects manually identified by the customer as important to the operation of their computing infrastructure. In other examples, the blueprint may correspond to a blueprint recommended to the customer. In some cases, the blueprint may include one or more modifications to the recommended blueprint.

At 310, characteristics of the computing objects running at the computing system may be determined (e.g., by the recommendation engine). The characteristics of the computing objects may include a server used to implement the computing object, a data center used to implement the computing object, a hypervisor used to manage the computing object, a service level agreement assigned to the computing object, a data churn rate associated with the computing object, a retention policy for the computing object, a naming of the computing object, an availability set of the computing object, an IP address assigned to the computing object, a failover target for the computing object, a replication duration for the computing object, a data pattern for the computing object, a recovery group assigned in a customer-generated blueprint, or any combination thereof.

Data information (e.g., data churn, data patterns, access frequency, etc.) for a computing object may be received from a data management system (e.g., DMS 210) that provide a continuous data protection service to the computing system 205, where the continuous data protection service may monitor I/O flows the computing system 205, including I/O flows to the computing object. Service level agreement information (e.g., retention durations, failover locations, etc.) may also be obtained from the data management system.

At 315, the computing objects may be grouped (e.g., by the recommendation engine) based on the determined characteristics of the computing objects. In some examples, a group for each characteristic may be formed. Accordingly, each of the computing objects may be listed in one or more groups.

At 320, recovery groups may be formed (e.g., by the recommendation engine) based on the formed characteristic groupings. Each computing object may be assigned to a single recovery group, where a recovery group may provide a set of instructions for recovering the computing objects within the recovery group. The set of instructions may include instructions for allocating computing resources to the recovered computing objects, instructions for protecting data for the recovered computing objects (e.g., in accordance with an assigned SLA), and the like. In some examples, the instructions for allocating computing resources to the recovered computing objects is based on an amount of computing resources allocated to the computing objects while running at the computing system. In some examples, the instructions for allocating computing resources to the recovered computing objects is based on an average amount of computing resources used by the computing objects while running at the computing system. In some examples, the service level agreement assigned to the recovered computing objects is based on (e.g., the same as) the service level agreement assigned to the computing objects while running at the computing system.

In some examples, computing objects that are implemented at a same rack, switch, hypervisor, or any combination thereof, may be include in a same recovery group. In some examples, computing objects that are implemented in a same data center may be included in a same recovery group. In some examples, computing objects that are covered by a same or similar service level agreements may be included in a same recovery group. In some examples, computing objects having a same data pattern (e.g., a same data churn rate, bursty data access, frequent data access, etc.) may be included in a same recovery group. In some examples, computing objects having a same archival duration may be included in a same recovery group. In some examples, computing objects having similar creation times (e.g., creation times within a threshold duration of one another) may be included in a same recovery group. In some examples, computing objects that are included in a same computing group (e.g., a same availability set) may be included in a same recovery group. In some examples, computing objects having IP address within an IP address range may be included in a same recovery group. In some examples, computing objects that have a same failover target, replication duration or both may be included in a same recovery group.

In one example, computing objects that share a naming convention (e.g., a common prefix or suffix) may be included in a first recovery group, and computing objects that share a data pattern may be included in a second recovery group. In some examples, computing objects that are included in the first recovery group may be omitted from the second recovery group despite having the data pattern. That is, certain characteristics (e.g., the naming characteristic associated with the first recovery group) may be weighted more heavily than other characteristics (e.g., the data pattern characteristic associated with the second recovery group). In another example, computing objects that share multiple characteristics (e.g., a naming convention and a creation time) may be included in a same recovery group. In additional examples, cost may be considered in grouping the computing objects.

In some examples, one or more recovery groups may be generated in accordance with a customer-generated blueprint that groups certain computing objects together. In such cases, the customer designations may override other characteristics of the computing objects. For example, a computing object sharing a naming convention with the computing objects in a first recovery group may be omitted from the first recovery group based on being included in a customer-designated group.

In some examples, the recovery groups are ordered relative to one another in accordance with an order for recovering the computing objects in the recovery groups. That is, the computing objects in a recovery group in an initial position of the order may be recovered first, the computing objects in a recovery group in the next position of the order may be recovered second, and so on.

In some examples, when determining which recovery groups to create, the recommendation engine may first identify the groupings of the computing objects. For example, the recommendation engine may determine that the groupings include a group of computing objects that have a similar naming convention, a group of computing objects that have a same failover target; a group of computing objects that are in a same network, and a group of computing objects that are in a same data center. In some examples, relationships between the computing objects in the name-based group may be assigned a first weight (e.g., 50), relationships between the computing objects in the failover-based group may be assigned a second weight (e.g., 25), relationships between the computing objects in the network-based group may be assigned a third weight (e.g., 20), and relationships between the computing objects in the data center-based group may be assigned a fourth weight (e.g., 10). For computing objects that are related with one another in more than one way, the relationship between the computing objects may be equal to the sum of the weights—e.g., a relationship between computing objects that share a network and data center may be assigned a combined weight of 31.

The recommendation engine may then sort the computing objects into recovery groups based on the strength of the relationships between the computing objects. For example, the recommendation engine may assign computing objects sharing a naming convention to a first name-based recovery group even if the computing objects share one or more other characteristics (e.g., failover targets) with other computing objects. If recovery groups for combinations of characteristics are used (e.g., a naming convention/network-based recovery group), the recommendation engine may determine whether the combined strength of the relationships between the computing objects overcomes other relationships. For example, if two computing objects share a naming convention and failover target, the computing objects may be assigned to a naming convention/failover-based group instead of the name-based recovery group. In another example, if two computing objects share a naming convention, failover target, network, and data center, the computing objects may be assigned to a failover/network/data center-based recovery group instead of the name-based recovery group. In similar examples, relationships between computing objects with a same data pattern may be assigned a first weight (e.g., 50), relationships between computing objects with a similar naming convention may be assigned a second weight (e.g., 30), and relationships between computing objects in a same network may be assigned a third weight (e.g., 20).

At 325, one or more recommended blueprints may be generated (e.g., by the recommendation engine) based on the recovery grouping. A recommended blueprint may include a consolidation of the sets of instructions associated with each of the recovery groups. Accordingly, a single blueprint may be capable of orchestrating a recovery for a large portion (e.g., a majority or all) of the computing objects. In some examples, the recommended blueprint may be a modification of a currently selected blueprint. For example, the recommended blueprint may include one or more suggestions to move a computing object from one recovery group to another recovery group (e.g., a higher priority recovery group) based on the computing object being included in the other recovery group at 320.

At 330, the one or more recommended blueprints may be provided (e.g., by the recovery engine) to a user interface. The one or more recommended blueprints may include blueprints that are directed to different goals. For example, a first suggested blueprint may be directed to increasing recovery speed, a second suggested blueprint may be directed to increasing recovery stability, a third suggested blueprint may be directed to reducing a cost of the recovery, and so on.

At 335, a selection of a recommended blueprint from the one or more recommended blueprints may be received (e.g., at the recovery engine). In some examples, the selection of the recommended blueprint is accompanied by an indication of one or more modifications to the recommended blueprint—e.g., an indication that one or more computing objects have been moved to a different recovery group, that a different allocation of resources is to be allocated to a computing object, and the like.

At 340, the selected blueprint may be configured (e.g., by the recovery engine) for recovery of the computing objects if a recovery event occurs. That is, the recovery engine may generate and store a configuration for orchestrating the recovery of the computing objects in accordance with the selected blueprint.

At 345, a recovery (e.g., by the recovery engine) of the computing objects may be performed in accordance with the selected blueprint based on the occurrence of a recovery event. The recovery event may include the occurrence of a natural disaster in an area that includes the computing system, damage to the computing system, power loss at the computing system, the detection of a malware attack on the computing, the detection that the computing system has been compromised, the triggering of a recovery test, and the like.

In some examples, the selected blueprint may remain configured for the computing objects until a customer disables the selected blueprint or requests an update to the selected blueprint. In some cases, the recovery engine may periodically provide the customer with a new suggested blueprint or suggestions for modifying the configured blueprint based on a continued monitoring (e.g., by the recommendation engine) of the characteristics of the computing objects. The suggestions for modifying the configured blueprint may include an indication of which instructions are being modified, which computing objects are affected, reasons for the modification, and the like. In response to the new suggestions, the recovery engine may receive a selection or denial of the new blueprint or the suggested modifications.

Figure 4:
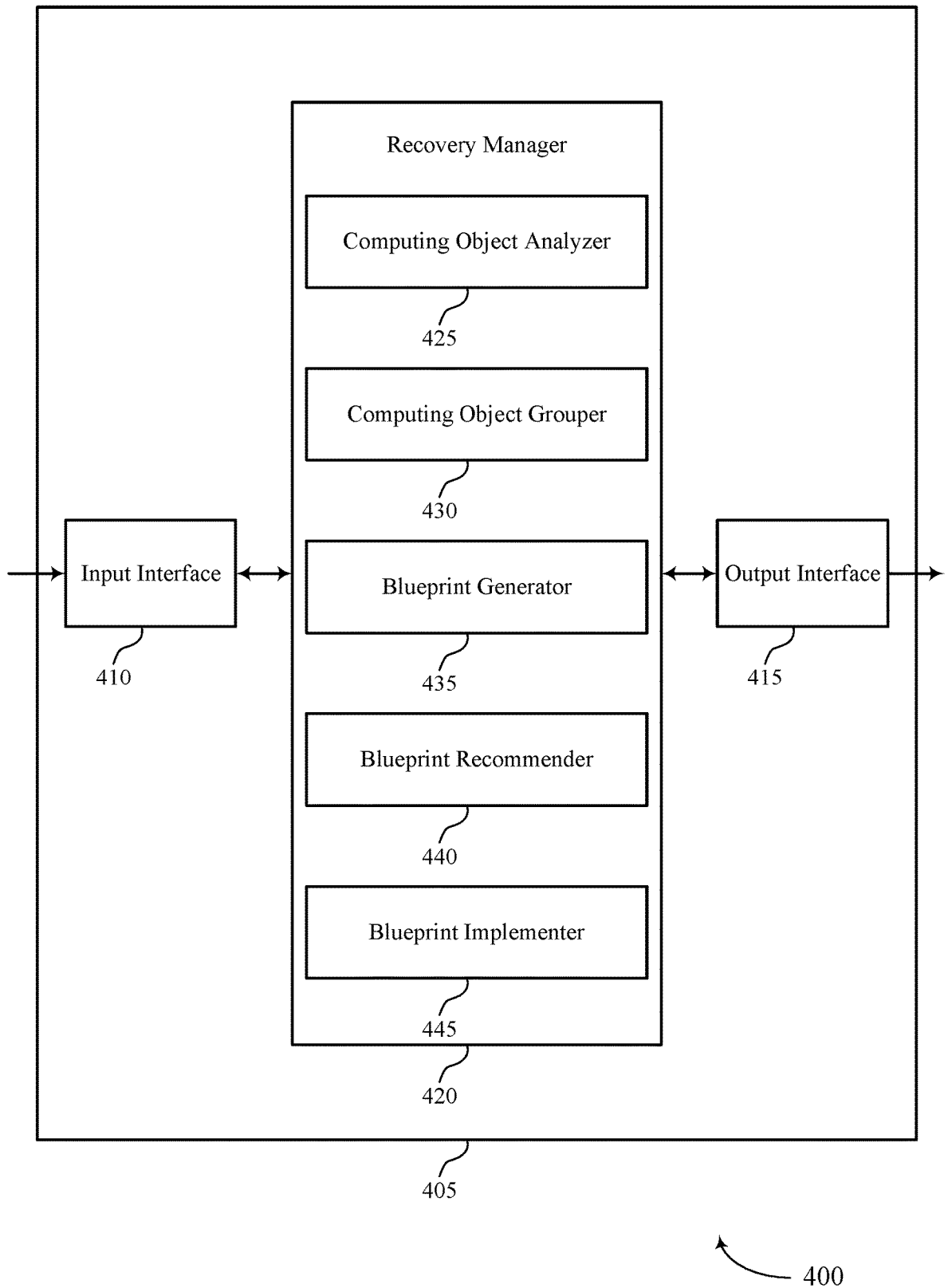
FIG. 4 shows a block diagram of a system that supports suggesting blueprints for recovering computing objects in accordance with aspects of the present disclosure.

FIG. 4 shows a block diagram 400 of a system 405 that supports suggesting blueprints for recovering computing objects in accordance with aspects of the present disclosure. In some examples, the system 405 may be an example of aspects of one or more components described with reference to FIG. 1, such as a DMS 110. The system 405 may include an input interface 410, an output interface 415, and a recovery manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the recovery manager 420 to support suggesting blueprints for recovering computing objects. In some cases, the input interface 410 may be a component of a network interface 615 as described with reference to FIG. 6

The output interface 415 may manage output signaling for the system 405. For example, the output interface 415 may receive signaling from other components of the system 405, such as the recovery manager 420, and may transmit such output signaling corresponding to (e.g., representative of or otherwise based on) such signaling to other systems or devices. In some cases, the output interface 415 may be a component of a network interface 615 as described with reference to FIG. 6.

The recovery manager 420 may include a computing object analyzer 425, a computing object grouper 430, a blueprint generator 435, a blueprint recommender 440, a blueprint implementer 445, or any combination thereof. In some examples, the recovery manager 420, or various components thereof, may be configured to perform various operations (e.g., receiving, monitoring, transmitting) using or otherwise in cooperation with the input interface 410, the output interface 415, or both. For example, the recovery manager 420 may receive information from the input interface 410, send information to the output interface 415, or be integrated in combination with the input interface 410, the output interface 415, or both to receive information, transmit information, or perform various other operations as described herein.

The computing object analyzer 425 may be configured as or otherwise support a means for determining characteristics of a set of computing objects managed by a computing system. The computing object grouper 430 may be configured as or otherwise support a means for grouping, using the characteristics of the set of computing objects, the set of computing objects into a set of multiple groups. The blueprint generator 435 may be configured as or otherwise support a means for generating, based on grouping the set of computing objects into the set of multiple groups, an instruction set defining a configuration for recovering computing objects of the set of computing objects in response to a recovery event. The blueprint recommender 440 may be configured as or otherwise support a means for transmitting, to a user interface, the instruction set as a suggestion, where the instruction set indicates a grouping of the computing objects of the set of computing objects. The blueprint implementer 445 may be configured as or otherwise support a means for configuring, based on receiving an indication of a selection of the instruction set, a recovery engine to recover the computing objects of the set of computing objects in accordance with the configuration for recovering the computing objects of the set of computing objects.

Figure 5:
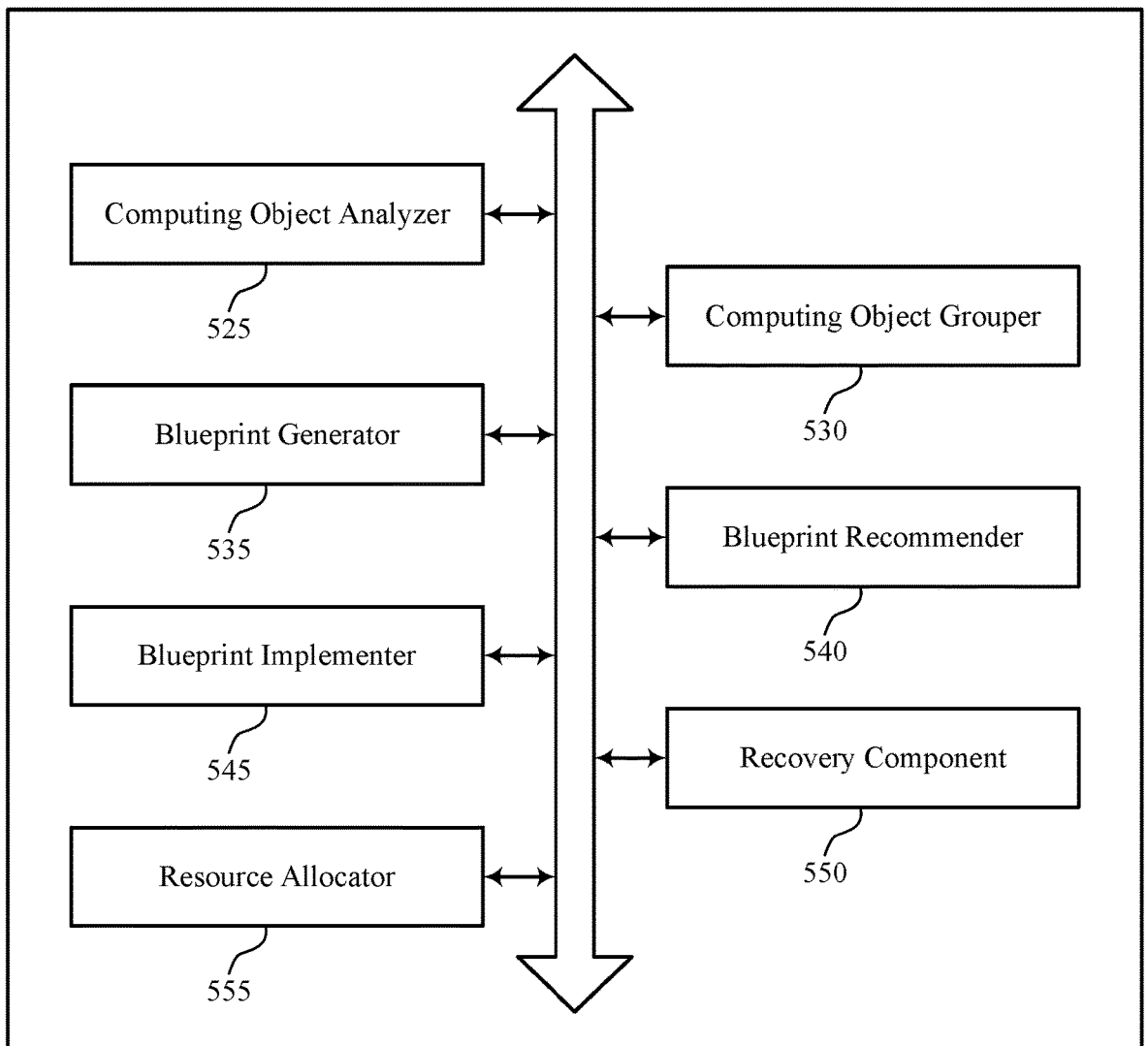
FIG. 5 shows a block diagram of a storage manager that supports suggesting blueprints for recovering computing objects in accordance with aspects of the present disclosure.

FIG. 5 shows a block diagram 500 of a recovery manager 520 that supports suggesting blueprints for recovering computing objects in accordance with aspects of the present disclosure. The recovery manager 520 may be an example of aspects of a recovery manager or a recovery manager 420, or both, as described herein. The recovery manager 520, or various components thereof, may be an example of means for performing various aspects of suggesting blueprints for recovering computing objects as described herein. For example, the recovery manager 520 may include a computing object analyzer 525, a computing object grouper 530, a blueprint generator 535, a blueprint recommender 540, a blueprint implementer 545, a recovery component 550, a resource allocator 555, or any combination thereof. Each of these components may communicate, directly or indirectly, with one another (e.g., via one or more buses).

The computing object analyzer 525 may be configured as or otherwise support a means for determining characteristics of a set of computing objects managed by a computing system. The computing object grouper 530 may be configured as or otherwise support a means for grouping, using the characteristics of the set of computing objects, the set of computing objects into a set of multiple groups. The blueprint generator 535 may be configured as or otherwise support a means for generating, based on grouping the set of computing objects into the set of multiple groups, an instruction set defining a configuration for recovering computing objects of the set of computing objects in response to a recovery event. The blueprint recommender 540 may be configured as or otherwise support a means for transmitting, to a user interface, the instruction set as a suggestion, where the instruction set indicates a grouping of the computing objects of the set of computing objects. The blueprint implementer 545 may be configured as or otherwise support a means for configuring, based on receiving an indication of a selection of the instruction set, a recovery engine to recover the computing objects of the set of computing objects in accordance with the configuration for recovering the computing objects of the set of computing objects.

In some examples, the blueprint implementer 545 may be configured as or otherwise support a means for receiving, via a device including the user interface, the indication of the selection of the instruction set in response to transmitting the instruction set to the user interface.

In some examples, the blueprint implementer 545 may be configured as or otherwise support a means for receiving, via a device including the user interface, an indication of one or more modifications to the instruction set based on transmitting the instruction set to the user interface.

In some examples, the recovery component 550 may be configured as or otherwise support a means for identifying, after configuring the recovery engine to recover the computing objects in accordance with the configuration for recovering the computing objects of the set of computing objects, an occurrence of the recovery event. In some examples, the recovery component 550 may be configured as or otherwise support a means for autonomously recovering, as a result of identifying the occurrence of the recovery event, the computing objects of the set of computing objects in accordance with the configuration for recovering the computing objects of the set of computing objects.

In some examples, the recovery event includes damage to the computing system, an identification of malware on the computing system, a power loss at the computing system, or any combination thereof.

In some examples, the blueprint generator 535 may be configured as or otherwise support a means for identifying the computing objects of the set of computing objects based on the grouping of the set of computing objects, the computing objects sharing one or more of the characteristics. In some examples, the resource allocator 555 may be configured as or otherwise support a means for identifying, based on identifying the computing objects, a set of computing resources allocated to the computing objects, where generating the instruction set defining the configuration for recovering the computing objects includes. In some examples, the blueprint generator 535 may be configured as or otherwise support a means for generating instructions for allocating computing resources to the computing objects after recovering the computing objects, the instructions for allocating computing resources being based on the set of computing resources allocated to the computing objects.

In some examples, the blueprint generator 535 may be configured as or otherwise support a means for generating a set of multiple instruction sets for recovering respective computing objects of the set of computing objects in response to the recovery event, the set of multiple instruction sets including the instruction set for recovering the computing objects. In some examples, the blueprint recommender 540 may be configured as or otherwise support a means for transmitting, to the user interface, the set of multiple instruction sets as one or more suggestions, where transmitting the set of multiple instruction sets includes transmitting the instruction set to the user interface.

In some examples, the blueprint generator 535 may be configured as or otherwise support a means for determining a pattern for executing the set of multiple instruction sets for recovering the respective computing objects of the computing objects based on respective characteristics of the respective computing objects. In some examples, the blueprint recommender 540 may be configured as or otherwise support a means for where an indication of the pattern for executing the set of multiple instruction sets is transmitted to the user interface with the set of multiple instruction sets.

In some examples, the blueprint generator 535 may be configured as or otherwise support a means for determining that the computing objects of the set of computing objects are included in a group of the set of multiple groups based on the computing objects sharing a naming convention, where the instruction set defining the configuration for recovering the computing objects is generated as a result of determining that the computing objects are included in the group.

In some examples, a first subset of the computing objects are further included in a second group as a result of the first subset of the computing objects being located on a first server and a second subset of the computing objects are further included in a third group as a result of the second subset of the computing objects being located on a second server.

In some examples, the blueprint generator 535 may be configured as or otherwise support a means for determining that second computing objects of the set of computing objects are included in a second group of the set of multiple groups based on the second computing objects sharing a data pattern classification. In some examples, the blueprint generator 535 may be configured as or otherwise support a means for generating a second instruction set defining a configuration for recovering the second computing objects as a result of determining that the second computing objects are included in the second group.

In some examples, the blueprint generator 535 may be configured as or otherwise support a means for determining that the instruction set for recovering the computing objects is configured to recover a computing object of the second computing objects, where. In some examples, the blueprint generator 535 may be configured as or otherwise support a means for generating the second instruction set for recovering the second computing objects includes excluding the computing object of the second computing objects from recovery by the second instruction set as a result of determining that the instruction set for recovering the computing objects is configured to recover the computing object of the second computing objects.

In some examples, determining the characteristics of the set of computing objects includes determining, for each computing object of the set of computing objects a name; a host server; a host data center; an assigned service level agreement; a creation time; an assigned computing group; an Internet Protocol address; a failover target; a data pattern classification, or any combination thereof.

In some examples, grouping the set of computing objects into the set of multiple groups includes grouping first computing objects of the set of computing objects into a first group based on the first computing objects sharing a naming convention; grouping second computing objects of the set of computing objects into a second group based on the second computing objects being hosted on a same host server; grouping third computing objects of the set of computing objects into a third group based on the third computing objects being hosted in a same host data center; grouping fourth computing objects of the set of computing objects into a fourth group based on the fourth computing objects being assigned a same service level agreement; grouping fifth computing objects of the set of computing objects into a fifth group based on the fifth computing objects being created within a threshold duration of one another; grouping sixth computing objects of the set of computing objects into a sixth group based on the sixth computing objects being assigned a same computing group; grouping seventh computing objects of the set of computing objects into a seventh group based on the seventh computing objects having Internet Protocol addresses within a range of Internet Protocol addresses; grouping eighth computing objects into an eighth group based on the eighth computing objects being assigned a same failover target; grouping ninth computing objects into a ninth group based on the ninth computing objects sharing a same data pattern classification; or any combination thereof.

In some examples, the computing objects of the set of computing objects are included in one or more groups of the set of multiple groups.

Figure 6:
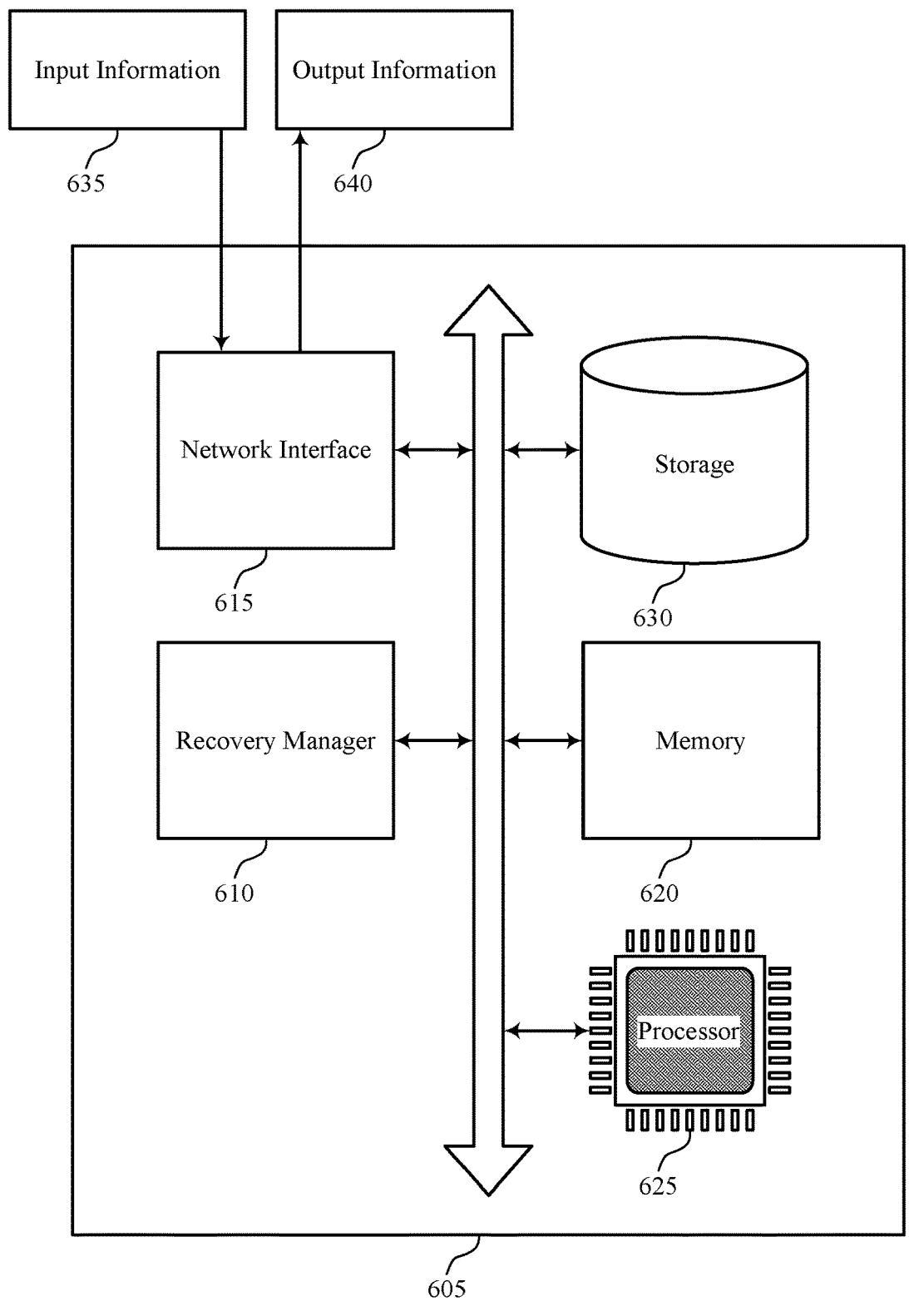
FIG. 6 shows a block diagram of a system including a device that supports suggesting blueprints for recovering computing objects in accordance with aspects of the present disclosure.

FIG. 6 shows a block diagram 600 of a system 605 that supports suggesting blueprints for recovering computing objects in accordance with aspects of the present disclosure. The system 605 may include components for data management, including components such as a recovery manager 610, a network interface 615, memory 620, processor 625, and storage 630. These components may be in electronic communication or otherwise coupled with each other (e.g., operatively, communicatively, functionally, electronically, electrically; via one or more buses, communications links, communications interfaces, or any combination thereof). Additionally, the components of the system 605 may comprise corresponding physical components or may be implemented as corresponding virtual components (e.g., components of one or more virtual machines). In some examples, the system 605 may be an example of aspects of one or more components described with reference to FIG. 1, such as a DMS 110.

The network interface 615 may enable the system 605 to exchange information (e.g., input information 635, output information 640, or both) with other systems or devices (not shown). For example, the network interface 615 may enable the system 605 to connect to a network (e.g., a network 120 as described herein). The network interface 615 may include one or more wireless network interfaces, one or more wired network interfaces, or any combination thereof. In some examples, the network interface 615 may be an example of aspects of one or more components described with reference to FIG. 1, such as one or more network interfaces 165.

Memory 620 may include RAM, ROM, or both. The memory 620 may store computer-readable, computer-executable software including instructions that, when executed, cause the processor 625 to perform various functions described herein. In some cases, the memory 620 may contain, among other things, a basic input/output system (BIOS), which may control basic hardware or software operation such as the interaction with peripheral components or devices. In some cases, the memory 620 may be an example of aspects of one or more components described with reference to FIG. 1, such as one or more memories 175.

The processor 625 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 625 may be configured to execute computer-readable instructions stored in a memory 620 to perform various functions (e.g., functions or tasks supporting suggesting blueprints for recovering computing objects). Though a single processor 625 is depicted in the example of FIG. 6, it is to be understood that the system 605 may include any quantity of one or more of processors 625 and that a group of processors 625 may collectively perform one or more functions ascribed herein to a processor, such as the processor 625. In some cases, the processor 625 may be an example of aspects of one or more components described with reference to FIG. 1, such as one or more processors 170.

Storage 630 may be configured to store data that is generated, processed, stored, or otherwise used by the system 605. In some cases, the storage 630 may include one or more HDDs, one or more SDDs, or both. In some examples, the storage 630 may be an example of a single database, a distributed database, multiple distributed databases, a data store, a data lake, or an emergency backup database. In some examples, the storage 630 may be an example of one or more components described with reference to FIG. 1, such as one or more network disks 180.

The recovery manager 610 may be configured as or otherwise support a means for determining characteristics of a set of computing objects managed by a computing system. The recovery manager 610 may be configured as or otherwise support a means for grouping, using the characteristics of the set of computing objects, the set of computing objects into a set of multiple groups. The recovery manager 610 may be configured as or otherwise support a means for generating, based on grouping the set of computing objects into the set of multiple groups, an instruction set defining a configuration for recovering computing objects of the set of computing objects in response to a recovery event. The recovery manager 610 may be configured as or otherwise support a means for transmitting, to a user interface, the instruction set as a suggestion, where the instruction set indicates a grouping of the computing objects of the set of computing objects. The recovery manager 610 may be configured as or otherwise support a means for configuring, based on receiving an indication of a selection of the instruction set, a recovery engine to recover the computing objects of the set of computing objects in accordance with the configuration for recovering the computing objects of the set of computing objects.

By including or configuring the recovery manager 610 in accordance with examples as described herein, the system 605 may support techniques for suggesting blueprints for recovering computing objects, which may provide one or more benefits such as, for example, improved reliability, improved user experience, more efficient utilization of computing resources, network resources or both, improved scalability, or improved security, among other possibilities.

Figure 7:
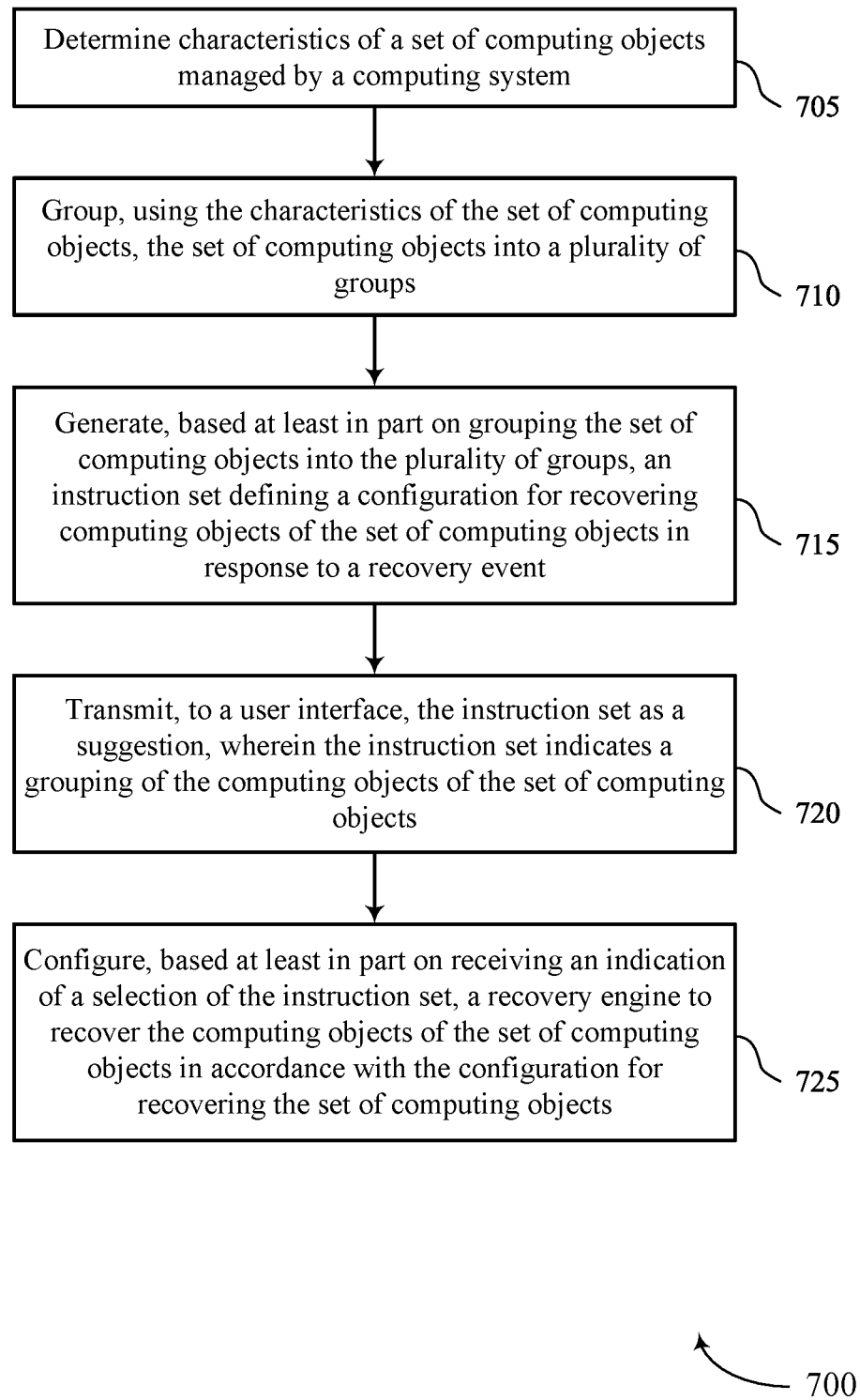
FIG. 7 shows a flowchart illustrating methods that support suggesting blueprints for recovering computing objects in accordance with aspects of the present disclosure.

FIG. 7 shows a flowchart illustrating a method 700 that supports suggesting blueprints for recovering computing objects in accordance with aspects of the present disclosure. The operations of the method 700 may be implemented by a computing system or its components as described herein. For example, the operations of the method 700 may be performed by a computing system as described with reference to FIGS. 1 through 6. In some examples, a computing system may execute a set of instructions to control the functional elements of the computing system to perform the described functions. Additionally, or alternatively, the computing system may perform aspects of the described functions using special-purpose hardware.

At 705, the method may include determining characteristics of a set of computing objects managed by a computing system. The operations of 705 may be performed in accordance with examples as disclosed herein. In some examples, aspects of the operations of 705 may be performed by a computing object analyzer 525 as described with reference to FIG. 5.

At 710, the method may include grouping, using the characteristics of the set of computing objects, the set of computing objects into a set of multiple groups. The operations of 710 may be performed in accordance with examples as disclosed herein. In some examples, aspects of the operations of 710 may be performed by a computing object grouper 530 as described with reference to FIG. 5.

At 715, the method may include generating, based on grouping the set of computing objects into the set of multiple groups, an instruction set defining a configuration for recovering computing objects of the set of computing objects in response to a recovery event. The operations of 715 may be performed in accordance with examples as disclosed herein. In some examples, aspects of the operations of 715 may be performed by a blueprint generator 535 as described with reference to FIG. 5.

At 720, the method may include transmitting, to a user interface, the instruction set as a suggestion, where the instruction set indicates a grouping of the computing objects of the set of computing objects. The operations of 720 may be performed in accordance with examples as disclosed herein. In some examples, aspects of the operations of 720 may be performed by a blueprint recommender 540 as described with reference to FIG. 5.

At 725, the method may include configuring, based on receiving an indication of a selection of the instruction set, a recovery engine to recover the computing objects of the set of computing objects in accordance with the configuration for recovering the computing objects of the set of computing objects. The operations of 725 may be performed in accordance with examples as disclosed herein. In some examples, aspects of the operations of 725 may be performed by a blueprint implementer 545 as described with reference to FIG. 5.

A method is described. The method may include determining characteristics of a set of computing objects managed by a computing system, grouping, using the characteristics of the set of computing objects, the set of computing objects into a set of multiple groups, generating, based on grouping the set of computing objects into the set of multiple groups, an instruction set defining a configuration for recovering computing objects of the set of computing objects in response to a recovery event, transmitting, to a user interface, the instruction set as a suggestion, where the instruction set indicates a grouping of the computing objects of the set of computing objects, and configuring, based on receiving an indication of a selection of the instruction set, a recovery engine to recover the computing objects of the set of computing objects in accordance with the configuration for recovering the computing objects of the set of computing objects.

An apparatus is described. The apparatus may include a processor, memory coupled with the processor, and instructions stored in the memory. The instructions may be executable by the processor to cause the apparatus to determine characteristics of a set of computing objects managed by a computing system, group, using the characteristics of the set of computing objects, the set of computing objects into a set of multiple groups, generate, based on grouping the set of computing objects into the set of multiple groups, an instruction set defining a configuration for recovering computing objects of the set of computing objects in response to a recovery event, transmit, to a user interface, the instruction set as a suggestion, where the instruction set indicates a grouping of the computing objects of the set of computing objects, and configure, based on receiving an indication of a selection of the instruction set, a recovery engine to recover the computing objects of the set of computing objects in accordance with the configuration for recovering the computing objects of the set of computing objects.

Another apparatus is described. The apparatus may include means for determining characteristics of a set of computing objects managed by a computing system, means for grouping, using the characteristics of the set of computing objects, the set of computing objects into a set of multiple groups, means for generating, based on grouping the set of computing objects into the set of multiple groups, an instruction set defining a configuration for recovering computing objects of the set of computing objects in response to a recovery event, means for transmitting, to a user interface, the instruction set as a suggestion, where the instruction set indicates a grouping of the computing objects of the set of computing objects, and means for configuring, based on receiving an indication of a selection of the instruction set, a recovery engine to recover the computing objects of the set of computing objects in accordance with the configuration for recovering the computing objects of the set of computing objects.

A non-transitory computer-readable medium storing code is described. The code may include instructions executable by a processor to determine characteristics of a set of computing objects managed by a computing system, group, using the characteristics of the set of computing objects, the set of computing objects into a set of multiple groups, generate, based on grouping the set of computing objects into the set of multiple groups, an instruction set defining a configuration for recovering computing objects of the set of computing objects in response to a recovery event, transmit, to a user interface, the instruction set as a suggestion, where the instruction set indicates a grouping of the computing objects of the set of computing objects, and configure, based on receiving an indication of a selection of the instruction set, a recovery engine to recover the computing objects of the set of computing objects in accordance with the configuration for recovering the computing objects of the set of computing objects.

Some examples of the method, apparatuses, and non-transitory computer-readable medium described herein may further include operations, features, means, or instructions for receiving, via a device including the user interface, the indication of the selection of the instruction set in response to transmitting the instruction set to the user interface.

Some examples of the method, apparatuses, and non-transitory computer-readable medium described herein may further include operations, features, means, or instructions for receiving, via a device including the user interface, an indication of one or more modifications to the instruction set based on transmitting the instruction set to the user interface.

Some examples of the method, apparatuses, and non-transitory computer-readable medium described herein may further include operations, features, means, or instructions for identifying, after configuring the recovery engine to recover the computing objects in accordance with the configuration for recovering the computing objects of the set of computing objects, an occurrence of the recovery event and autonomously recovering, as a result of identifying the occurrence of the recovery event, the computing objects of the set of computing objects in accordance with the configuration for recovering the computing objects of the set of computing objects.

In some examples of the method, apparatuses, and non-transitory computer-readable medium described herein, the recovery event includes damage to the computing system, an identification of malware on the computing system, a power loss at the computing system, or any combination thereof.

Some examples of the method, apparatuses, and non-transitory computer-readable medium described herein may further include operations, features, means, or instructions for identifying the computing objects of the set of computing objects based on the grouping of the set of computing objects, the computing objects sharing one or more of the characteristics, identifying, based on identifying the computing objects, a set of computing resources allocated to the computing objects, where generating the instruction set defining the configuration for recovering the computing objects includes, and generating instructions for allocating computing resources to the computing objects after recovering the computing objects, the instructions for allocating computing resources being based on the set of computing resources allocated to the computing objects.

Some examples of the method, apparatuses, and non-transitory computer-readable medium described herein may further include operations, features, means, or instructions for generating a set of multiple instruction sets for recovering respective computing objects of the set of computing objects in response to the recovery event, the set of multiple instruction sets including the instruction set for recovering the computing objects and transmitting, to the user interface, the set of multiple instruction sets as one or more suggestions, where transmitting the set of multiple instruction sets includes transmitting the instruction set to the user interface.

Some examples of the method, apparatuses, and non-transitory computer-readable medium described herein may further include operations, features, means, or instructions for determining a pattern for executing the set of multiple instruction sets for recovering the respective computing objects of the computing objects based on respective characteristics of the respective computing objects and where an indication of the pattern for executing the set of multiple instruction sets may be transmitted to the user interface with the set of multiple instruction sets.

Some examples of the method, apparatuses, and non-transitory computer-readable medium described herein may further include operations, features, means, or instructions for determining that the computing objects of the set of computing objects may be included in a group of the set of multiple groups based on the computing objects sharing a naming convention, where the instruction set defining the configuration for recovering the computing objects may be generated as a result of determining that the computing objects may be included in the group.

In some examples of the method, apparatuses, and non-transitory computer-readable medium described herein, a first subset of the computing objects may be further included in a second group as a result of the first subset of the computing objects being located on a first server and a second subset of the computing objects may be further included in a third group as a result of the second subset of the computing objects being located on a second server.

Some examples of the method, apparatuses, and non-transitory computer-readable medium described herein may further include operations, features, means, or instructions for determining that second computing objects of the set of computing objects may be included in a second group of the set of multiple groups based on the second computing objects sharing a data pattern classification and generating a second instruction set defining a configuration for recovering the second computing objects as a result of determining that the second computing objects may be included in the second group.

Some examples of the method, apparatuses, and non-transitory computer-readable medium described herein may further include operations, features, means, or instructions for determining that the instruction set for recovering the computing objects may be configured to recover a computing object of the second computing objects, where and generating the second instruction set for recovering the second computing objects includes excluding the computing object of the second computing objects from recovery by the second instruction set as a result of determining that the instruction set for recovering the computing objects may be configured to recover the computing object of the second computing objects.

Some examples of the method, apparatuses, and non-transitory computer-readable medium described herein may further include operations, features, means, or instructions for determining the characteristics of the set of computing objects includes determining, for each computing object of the set of computing objects a name; a host server; a host data center; an assigned service level agreement; a creation time; an assigned computing group; an Internet Protocol address; a failover target; a data pattern classification, or any combination thereof.

Some examples of the method, apparatuses, and non-transitory computer-readable medium described herein may further include operations, features, means, or instructions for grouping the set of computing objects into the set of multiple groups includes grouping first computing objects of the set of computing objects into a first group based on the first computing objects sharing a naming convention; grouping second computing objects of the set of computing objects into a second group based on the second computing objects being hosted on a same host server; grouping third computing objects of the set of computing objects into a third group based on the third computing objects being hosted in a same host data center; grouping fourth computing objects of the set of computing objects into a fourth group based on the fourth computing objects being assigned a same service level agreement; grouping fifth computing objects of the set of computing objects into a fifth group based on the fifth computing objects being created within a threshold duration of one another; grouping sixth computing objects of the set of computing objects into a sixth group based on the sixth computing objects being assigned a same computing group; grouping seventh computing objects of the set of computing objects into a seventh group based on the seventh computing objects having Internet Protocol addresses within a range of Internet Protocol addresses; grouping eighth computing objects into an eighth group based on the eighth computing objects being assigned a same failover target; grouping ninth computing objects into a ninth group based on the ninth computing objects sharing a same data pattern classification; or any combination thereof.

In some examples of the method, apparatuses, and non-transitory computer-readable medium described herein, the computing objects of the set of computing objects may be included in one or more groups of the set of multiple groups.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method at a computer-implemented restoration engine, comprising:
    determining characteristics of a set of computing objects managed by a computing system;
    grouping, using the characteristics of the set of computing objects, the set of computing objects into a plurality of groups;
    generating, based at least in part on grouping the set of computing objects into the plurality of groups, an instruction set defining a configuration for recovering computing objects of the set of computing objects, wherein the instruction set indicates a grouping of the computing objects of the set of computing objects and recovery instructions associated with the plurality of groups;
    transmitting, to a user interface, the instruction set as a suggestion, wherein the instruction set indicates the grouping of the computing objects and the recovery instructions associated with the plurality of groups;
    receiving, via a device comprising the user interface, an indication of one or more modifications to the instruction set based at least in part on transmitting the instruction set to the user interface, wherein the one or more modifications update a data recovery order of the set of computing objects;
    receiving, via the device comprising the user interface, an indication of a selection of the instruction set in response to transmitting the instruction set to the user interface;
    configuring, based at least in part on receiving the indication of the selection of the instruction set, a recovery engine to recover the computing objects of the set of computing objects in accordance with the configuration for recovering the computing objects of the set of computing objects; and
    autonomously recovering, in response to an occurrence of a recovery event and in accordance with the data recovery order, the computing objects of the set of computing objects to respective previous point-in-time versions of the computing objects in accordance with the configuration for recovering the computing objects of the set of computing objects.

2. The method of claim 1, further comprising:
    identifying, after configuring the recovery engine to recover the computing objects in accordance with the configuration for recovering the computing objects of the set of computing objects, the occurrence of the recovery event, wherein the computing objects are autonomously recovered based at least in part on identifying the occurrence of the recovery event.

3. The method of claim 1, wherein the recovery event comprises damage to the computing system, an identification of malware on the computing system, a power loss at the computing system, or any combination thereof.

4. The method of claim 1, further comprising:
    identifying the computing objects of the set of computing objects based at least in part on the grouping of the set of computing objects, the computing objects sharing one or more of the characteristics; and
    identifying, based at least in part on identifying the computing objects, a set of computing resources allocated to the computing objects, wherein generating the instruction set defining the configuration for recovering the computing objects comprises:
        generating instructions for allocating computing resources to the computing objects after recovering the computing objects, the instructions for allocating computing resources being based at least in part on the set of computing resources allocated to the computing objects.

5. The method of claim 1, further comprising:
    generating a plurality of instruction sets for recovering respective computing objects of the set of computing objects in response to the recovery event, the plurality of instruction sets comprising the instruction set for recovering the computing objects; and
    transmitting, to the user interface, the plurality of instruction sets as one or more suggestions, wherein transmitting the plurality of instruction sets comprises transmitting the instruction set to the user interface.

6. The method of claim 5, further comprising:
    determining a pattern for executing the plurality of instruction sets for recovering the respective computing objects of the computing objects based at least in part on respective characteristics of the respective computing objects,
    wherein an indication of the pattern for executing the plurality of instruction sets is transmitted to the user interface with the plurality of instruction sets.

7. The method of claim 1, further comprising:
    determining that the computing objects of the set of computing objects are included in a group of the plurality of groups based at least in part on the computing objects sharing a naming convention, wherein the instruction set defining the configuration for recovering the computing objects is generated based at least in part on determining that the computing objects are included in the group.

8. The method of claim 7, wherein:
    a first subset of the computing objects are further included in a second group based at least in part on the first subset of the computing objects being located on a first server, and
    a second subset of the computing objects are further included in a third group based at least in part on the second subset of the computing objects being located on a second server.

9. The method of claim 7, further comprising:
    determining that second computing objects of the set of computing objects are included in a second group of the plurality of groups based at least in part on the second computing objects sharing a data pattern classification; and
    generating a second instruction set defining a second configuration for recovering the second computing objects based at least in part on determining that the second computing objects are included in the second group.

10. The method of claim 9, further comprising:
determining that the instruction set for recovering the computing objects is configured to recover a computing object of the second computing objects, wherein:
generating the second instruction set for recovering the second computing objects comprises excluding the computing object of the second computing objects from recovery by the second instruction set based at least in part on determining that the instruction set for recovering the computing objects is configured to recover the computing object of the second computing objects.

11. The method of claim 1, wherein determining the characteristics of the set of computing objects comprises:
determining, for each computing object of the set of computing objects a name; a host server; a host data center; an assigned service level agreement; a creation time; an assigned computing group; an Internet Protocol address; a failover target; a data pattern classification, or any combination thereof.

12. The method of claim 11, wherein grouping the set of computing objects into the plurality of groups comprises:
grouping first computing objects of the set of computing objects into a first group based at least in part on the first computing objects sharing a naming convention;
grouping second computing objects of the set of computing objects into a second group based at least in part on the second computing objects being hosted on a same host server;
grouping third computing objects of the set of computing objects into a third group based at least in part on the third computing objects being hosted in a same host data center;
grouping fourth computing objects of the set of computing objects into a fourth group based at least in part on the fourth computing objects being assigned a same service level agreement;
grouping fifth computing objects of the set of computing objects into a fifth group based at least in part on the fifth computing objects being created within a threshold duration of one another;
grouping sixth computing objects of the set of computing objects into a sixth group based at least in part on the sixth computing objects being assigned a same computing group;
grouping seventh computing objects of the set of computing objects into a seventh group based at least in part on the seventh computing objects having Internet Protocol addresses within a range of Internet Protocol addresses;
grouping eighth computing objects into an eighth group based at least in part on the eighth computing objects being assigned a same failover target;
grouping ninth computing objects into a ninth group based at least in part on the ninth computing objects sharing a same data pattern classification; or
any combination thereof.

13. The method of claim 1, wherein:
the computing objects of the set of computing objects are included in one or more groups of the plurality of groups.

14. An apparatus, comprising:
a processor; and
memory coupled with the processor, wherein instructions stored in the memory are executable by the processor to cause the apparatus to:
determine characteristics of a set of computing objects managed by a computing system;
group, using the characteristics of the set of computing objects, the set of computing objects into a plurality of groups;
generate, based at least in part on grouping the set of computing objects into the plurality of groups, an instruction set defining a configuration for recovering computing objects of the set of computing objects, wherein the instruction set indicates a grouping of the computing objects of the set of computing objects and recovery instructions associated with the plurality of groups;
transmit, to a user interface, the instruction set as a suggestion, wherein the instruction set indicates the grouping of the computing objects and the recovery instructions associated with the plurality of groups;
receive, via a device comprising the user interface, an indication of one or more modifications to the instruction set based at least in part on transmitting the instruction set to the user interface, wherein the one or more modifications update a data recovery order of the set of computing objects;
receive, via the device comprising the user interface, an indication of a selection of the instruction set in response to transmitting the instruction set to the user interface;
configure, based at least in part on receiving the indication of the selection of the instruction set, a recovery engine to recover the computing objects of the set of computing objects in accordance with the configuration for recovering the computing objects of the set of computing objects; and
autonomously recover, in response to an occurrence of a recovery event and in accordance with the data recovery order, the computing objects of the set of computing objects to respective previous point-in-time versions of the computing objects in accordance with the configuration for recovering the computing objects of the set of computing objects.

15. The apparatus of claim 14, wherein the instructions are further executable by the processor to cause the apparatus to:
identify, after configuring the recovery engine to recover the computing objects in accordance with the configuration for recovering the computing objects of the set of computing objects, the occurrence of the recovery event, wherein the computing objects are autonomously recovered based at least in part on identifying the occurrence of the recovery event.

16. A non-transitory, computer-readable medium storing code, the code comprising instructions executable by a processor to:
determine characteristics of a set of computing objects managed by a computing system;
group, using the characteristics of the set of computing objects, the set of computing objects into a plurality of groups;
generate, based at least in part on grouping the set of computing objects into the plurality of groups, an instruction set defining a configuration for recovering computing objects of the set of computing objects, wherein the instruction set indicates a grouping of the computing objects of the set of computing objects and recovery instructions associated with the plurality of groups;

transmit, to a user interface, the instruction set as a suggestion, wherein the instruction set indicates the grouping of the computing objects and the recovery instructions associated with the plurality of groups;

receive, via a device comprising the user interface, an indication of one or more modifications to the instruction set based at least in part on transmitting the instruction set to the user interface, wherein the one or more modifications update a data recovery order of the set of computing objects;

receive, via the device comprising the user interface, an indication of a selection of the instruction set in response to transmitting the instruction set to the user interface;

configure, based at least in part on receiving the indication of the selection of the instruction set, a recovery engine to recover the computing objects of the set of computing objects in accordance with the configuration for recovering the computing objects of the set of computing objects; and autonomously recover, in response to an occurrence of a recovery event and in accordance with the data recovery order, the computing objects of the set of computing objects to respective previous point-in-time versions of the computing objects in accordance with the configuration for recovering the computing objects of the set of computing objects.

* * * * *